Nov. 13, 1934.  R. TALAFRÉ ET AL  1,980,886
DEVICE INDICATING THE FLYING ATTITUDE OF AIRCRAFT
Filed Sept. 6, 1932  2 Sheets-Sheet 1

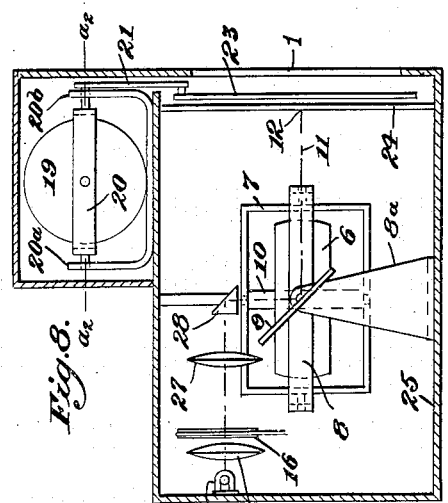
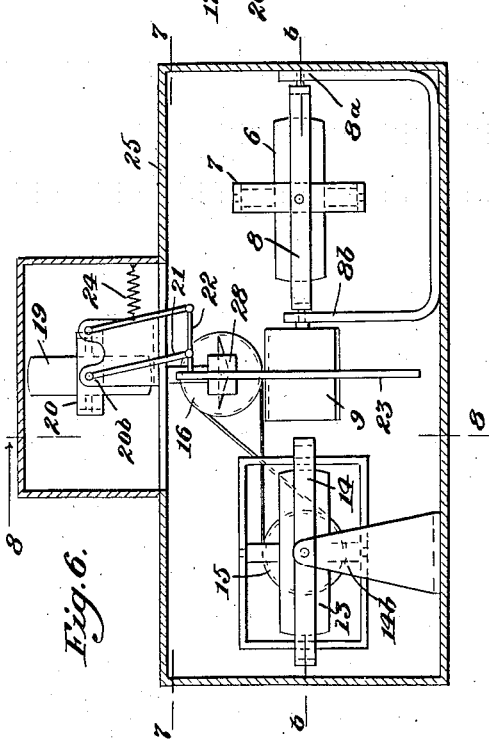 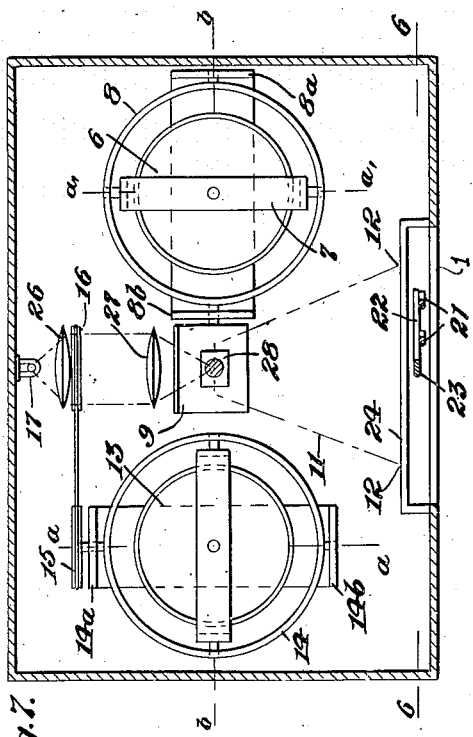
Inventors:
Rémi Talafré and
Henri Renault,

Patented Nov. 13, 1934

1,980,886

UNITED STATES PATENT OFFICE 1,980,886

DEVICE INDICATING THE FLYING ATTITUDE OF AIRCRAFT

Rémi Talafré, Paris, and Henri Renault, La Garenne-Colombes, France

Application September 6, 1932, Serial No. 631,910
In France September 9, 1931

4 Claims. (Cl. 33—204)

This invention relates to a device for indicating the flying attitude of aircraft that is to say a device whereby a pilot can constantly ascertain the position or flying attitude of the aircraft without making external observations. Such a device for instance enables a pilot to fly quite safely in fog, in clouds or by night.

The device of the present invention is of the type comprising indicating members responsive to longitudinal and lateral inclinations of the aircraft and to its turning movements about a vertical axis, said indicators being of the gyroscopic or other form of inclinometer and the indications produced being synthesized into one or more indicating means moving with reference to datum lines upon an observation screen.

In a device according to the present invention, two at least of indications produced by said indicating members are embodied into a single image by an optical device comprising a moving reflecting element controlled by one at least of said indicating members, said reflecting element receiving a beam of light emanating from a suitable source of light and incorporating the indication of one at least of the other indicating members.

The image may, for instance, represent the front part of the aircraft as it would appear to an observer from the rear of the machine.

In order that the invention may be more clearly understood, reference will now be made to the accompanying drawings which show, by way of example, a preferred device according to the invention applied to an aeroplane, and in which:

Fig. 6 is a cross-section of an embodiment of the complete attitude indicator of the invention taken along 6—6 (Fig. 7);

Fig. 7 is a cross-section of said indicator taken along 7—7 (Fig. 6); and

Fig. 8 is a cross-section of said indicator taken along 8—8 (Fig. 6).

In said drawings like parts are indicated by like reference characters.

Figure 1:
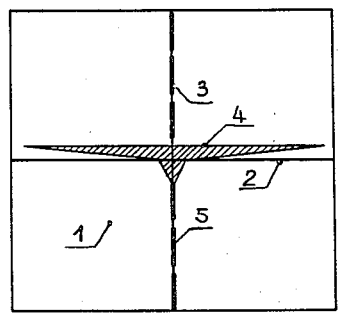
Figure 1 shows the image projected upon the screen when the aeroplane is flying horizontally along a straight course.

The flying attitude indicator illustrated comprises a screen 1, upon which are marked two fixed indexes 2 and 3, 2 representing a horizontal and 3 a vertical line. When the aeroplane is flying horizontally along a straight line, the positions of the image of the silhouette 4 and of the moving index 5 (coinciding in the present case with the index 3) are shown in Figure 1.

Figure 2:
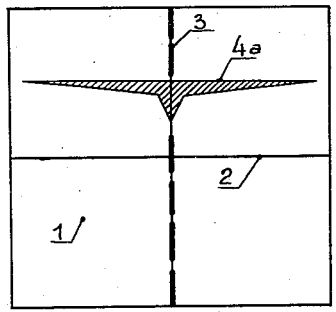
Figure 2 shows the position taken by the image when the aeroplane is rising.

When the machine rises the image of the silhouette moves to 4a (Fig. 2).

When the flying machine banks over to the left without turning, the image of the silhouette moves to 4b (Fig. 3), the moving index 5 coinciding then with index 3.

When the aeroplane turns while remaining in a horizontal plane, the moving index moves to 5c (Fig. 4) to the left or to the right side of the screen according to the direction of the turning or steering movement.

Figure 3:
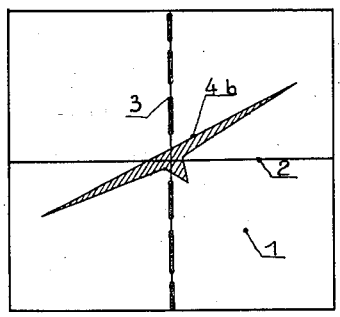
Figure 3 shows the position of the image when the aeroplane is banking to the left side.
Figure 4:
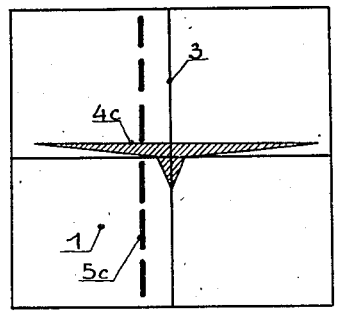
Figure 4 shows the position of the image when the aeroplane is turning in an horizontal plane.

The combination of the three movements shown in Figs. 2, 3 and 4 furnishes an image of every position of the aeroplane.

Figure 5:
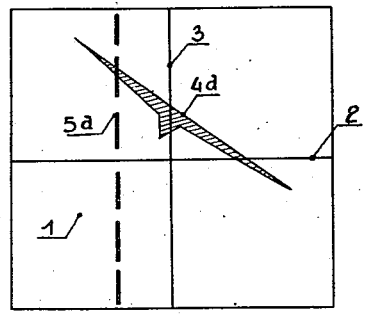
Figure 5 shows the position of the image when the aeroplane turns to the right at the same time as it rises.

Figure 5 shows, by way of example, the case of an aeroplane which turns to the right at the same time as it rises.

The device of the present invention permits flying under all conditions with the same ease as if the pilot could see outside in ideal weather, since the pilot needs merely look at the screen to ascertain the flying attitude of his machine and to control it.

The movements of the image and of the moving index upon the screen are produced by three conveniently arranged main instruments which comprise:

1. A longitudinal inclinometer which indicates the position of the longitudinal axis of the aeroplane with respect to a horizontal plane;

2. A lateral inclinometer indicating the position of the transversal or cross axis of the flying machine with reference to an horizontal plane; and 3. A steering indicator indicating the movements of the aeroplane about a vertical axis passing through the centre of gravity of the aeroplane.

The longitudinal inclinometer comprises essentially a gyroscope 6 suspended from a Cardan mounting in such a manner that the centre of gravity of the gyroscope is located slightly below the centre of suspension.

In this manner, the plane of the gyroscope, whether at rest or rotating is very nearly horizontal and the device assumes a very slow and very small movement of precession.

The gyroscope 6 turns in a frame 7 pivoted on an axis $a$ (parallel to the longitudinal axis of the aeroplane) inside a frame 8. The latter may pivot in journals 8a and 8b fixed in the body of the machine and supports a mirror 9.

Referring to Figs. 7 and 8 it will be seen that a light ray 10 falling upon the centre of the mirror 9 will be reflected at 11 and fall on the screen 1 at 12.

If, at this moment, the aeroplane should descend both the light ray 10 and the screen 1 which are carried away by the aeroplane move relatively to the horizontal plane containing the gyroscope 6 and to the mirror 9 and the reflected ray will fall upon the screen at a point below 12 and will thus indicate by its position that the flying machine is descending.

It can be seen that neither the movements of the aircraft about its longitudinal axis nor its turning movements about a vertical axis have any influence upon the relative positions of the mirror 9 and of the screen 1.

The construction of the transverse inclinometer (Figs. 6 and 7) is similar to that of the longitudinal inclinometer. However, in this case, the journals 14a and 14b of the outer frame 14 are disposed along an axis $a1$ $a1$ parallel to the longitudinal axis of the aeroplane. The journals 14a and 14b are secured to the body of the machine. The outer frame 14 supports a part 15 which may control the rotating movements of a silhouette 16 (Figs. 6 to 8) representing the aeroplane. If a source of light 17 and a suitable optical system are provided, the light beam emanating from said source will conform in shape to the outlines of the silhouette 16 and give of it a real image to the right of said system. It may readily be seen that if the part 15 and the silhouette 16 should turn in the same direction, an image would appear upon this screen which would assume relatively to the horizontal index line 2 (Figs. 1 and 5) inclinations which would be opposite or inverse of those to the aeroplane itself with respect to a horizontal plane. If then the relative directions of rotation of the parts 15 and 16 are reversed through a suitable process a correct displacement of the image 4 will be obtained.

Practically, the longitudinal inclinometer is arranged in such a manner that through the medium of a convenient optical system, the light rays coming from the transverse inclinometer, fall upon the mirror 9 (Figs. 7 and 8) so that a combination of both movements is obtained.

The steering or veering indicator (Figs. 6 to 8) consists of a gyroscope 19 suspended in a single moving frame 20 pivoted in journals 20a and 20b (secured to the aeroplane) about an axis $a2$ $a2$ parallel to the longitudinal axis of the machine. If the machine steers or veers about a vertical axis passing through its centre of gravity, the plan of rotation of the gyroscope 19 which is normally vertical tends to turn about the suspension axis $a2$ and $a2$ in a direction which depends upon the direction of rotation of the gyroscope. The frame 20 is rigidly secured to a rod 21 which forms one side of a parallel joint, the axis of rotation $a2$ $a2$ and $a3$ $a3$ of which are fixed with respect to the aeroplane. To the rod 22 of the parallel joint is secured a rod 23 which constitutes the moving index shown at 5 (Figs. 4 and 5). A spring 24 gives to the gyroscope 19 a suitable middle position.

In the embodiment of the complete device shown in Figs. 6 to 8, a casing 25 contains the three gyroscopes. Behind this casing is placed an auxiliary casing 26 in which is disposed the apparatus for reversing the relative movements of the lateral inclinometers, the silhouette 16 of the flying machine and the lighting device. The silhouette is illuminated by any suitable lighting system so arranged as to throw out parallel light rays (Fig. 7). In the embodiment shown in the drawings this lighting system is made of a source of light 17 disposed at the focus of a converging lens 26. The silhouette is, as previously set forth, controlled by the transverse inclinometer, the movement of which is reversed by a suitable device such as pulleys engaged by a cross wire. The light rays then enter the converging lens which gives of the silhouette a real image reflected by a prism or a mirror 28 and then by mirror 9 secured to the longitudinal inclinometer.

The light rays fall finally upon the translucent screen 1 upon which they form the luminous image 4 of the silhouette.

The rod 23 moves in front of the screen while remaining parallel to itself. This rod constitutes the moving index 5 of the steering or veering indicator. Opposite to this rod is placed, for instance, a glass 24 which protects the moving rod against external influences.

The gyroscopes may be driven by any suitable means such as air pressure or an electrical device. By way of example, the necessary power may be furnished by a small air compressor actuated by the air in which the flying machine is travelling.

The device according to the present invention offers among others the following advantages;

1. It enables the pilot to control the flying conditions with the aid of only one instrument;
2. It gives instantaneous indications;
3. It is much easier to realize the position of the flying machine from an image than from the indications of several instruments which necessitate reading characters. All these instruments may be replaced by the simple device of the present invention, which enables even an untrained or unskilled pilot to control his machine even without external observation.
4. It may be so constructed as to constitute a compact, self-contained unit which is also simple, foolproof and robust.

While in the foregoing there have been illustrated and described such combination and arrangement of elements as constitute the preferred embodiment of our invention, it should nevertheless be well understood that numerous modifications may be made therein without departing from the spirit or scope of the invention as defined in the appended claims.

Having now particularly described and ascertained the nature of our said invention and in what manner the same is to be performed, we declare that what we claim is:

1. A device for indicating the flying attitude of aircraft comprising indicating members responsive respectfully to longitudinal and lateral inclinations of the aircraft, an observation screen for receiving a beam of light, a suitable source of light, means controlled about a fore and aft axis by one of said indicating members for incorporating the image of an aircraft into said beam of light, and a moving reflecting element operatively connected with the other indicating member for projecting said beam of light upon the observation screen to control the position of said image up and down on said screen, whereby the indications of the indicating members are synthesized into the image moving upon said screen in accordance with the lateral and longitudinal inclinations of the supporting aircraft.

2. A device for indicating the flying attitude of aircraft comprising indicating members responsive respectively to longitudinal and lateral inclinations of the aircraft, an observation screen for receiving a beam of light, a suitable source of light, an aircraft simulating element operatively connected about a fore and aft axis with one of said indicating members and interposed in said beam of light which thereafter conforms in shape to the outlines of said aircraft simulating element, and a moving reflecting element operatively connected with the other indicating member for projecting said beam of light upon the observation screen, whereby the indications of the indicating members are synthesized into one image moving upon said screen in accordance with the lateral and longitudinal inclinations of the supporting aircraft.

3. A device for indicating the flying attitude of aircraft comprising indicating members responsive respectively to longitudinal and lateral inclinations of the aircraft, an observation screen for receiving a beam of light, a suitable source of light, an aircraft simulating element operatively connected with the lateral inclination indicating member and receiving said beam of light which conforms in shape to the outlines of said aircraft simulating element, and a moving reflecting element operatively connected with the longitudinal inclination indicating member for projecting said beam of light upon the observation screen to control the position of said image up and down on said screen whereby the indications of the lateral and longitudinal inclinations indicating members are synthesized into one image moving upon said screen in accordance with the lateral and longitudinal inclinations of said supporting aircraft.

4. A device for indicating the flying attitude of aircraft comprising indicating members responsive respectively to longitudinal and lateral inclinations of the aircraft, an observation screen for receiving a beam of light, a suitable source of light, means controlled about a fore and aft axis by one of said indicating members for incorporating the image of the aircraft into said beam of light, a moving reflecting element operatively connected with the other indicating member for projecting said beam of light upon the observation screen, to control the position of said image up and down on said screen whereby the indications of the indicating members are synthesized into one image moving upon said screen in accordance with the lateral and longitudinal inclinations of the supporting aircraft, and a third indicating member responsive to the turning movements of the aircraft about a vertical axis, said indicating member moving upon said screen in front of said image.

RÉMI TALAFRÉ.
HENRI RENAULT.